United States Patent [19]
MacDonald

[11] Patent Number: 4,617,321
[45] Date of Patent: Oct. 14, 1986

[54] SYNTHESIS OF HIGHLY CROSS-LINKED CATION-EXCHANGE POLYMERS FROM AN AQUEOUS SOLUTION

[75] Inventor: Russell J. MacDonald, Watertown, Mass.

[73] Assignee: Ionics, Incorporated, Watertown, Mass.

[21] Appl. No.: 751,710

[22] Filed: Jul. 2, 1985

[51] Int. Cl.$^4$ ...................... C08D 5/20; C08F 212/30
[52] U.S. Cl. ........................................ 521/38; 526/287
[58] Field of Search ..................... 521/38; 526/287; 204/296, 252, 301

[56] References Cited
U.S. PATENT DOCUMENTS 3,423,278  1/1969  Hodgdon, Jr. et al. .............. 521/38
4,139,684  2/1979  Coupek et al. ...................... 526/287

Primary Examiner—Joseph L. Schofer
Assistant Examiner—Peter F. Kulkosky
Attorney, Agent, or Firm—Norman E. Saliba

[57] ABSTRACT

The invention comprises the manufacture of cation exchangers by the copolymerization of a sulfonic acid with two other monomers such as acrylamide and n-methylolacrylamide which react simultaneously with the polymerization to form a cross-linking unit. The non-polymerizing (NP) solvent employed is water.

4 Claims, No Drawings

SYNTHESIS OF HIGHLY CROSS-LINKED CATION-EXCHANGE POLYMERS FROM AN AQUEOUS SOLUTION

BACKGROUND OF THE INVENTION (1) Field of Invention

This invention is directed to novel highly cross-linked cation-exchange polymers derived from water soluble amide monomers and an in situ cross-linking reaction in an aqueous solvent to produce the water insoluble polymers.

(2) Description of the Prior Art

The usual technique for the production of ion-exchange polymers involves polymerizing of a non-ionic, non-water soluble, di-ethylenic cross-linking agent, as for example, divinyl benzene with a monomer such as styrene in a non-aqueous solvent such as diethylbenzene. The resulting solid polymer, for example, in sheet or membrane form is equilibrated or washed several times with a solvent such as ethylene dichloride to remove and replace the diethyl-benzene solvent. Where cation exchange membranes are desired the membranes are then reacted with a solution of sulfur trioxide and ehylene dichloride to form the sulfonate groups which upon washing with methanol and neutralization with sodium bicarbonate gives the polymer its strongly basic ion-exchange properties. The prior art has disadvantages in that the monomers employed are water insoluble and the polymerization reaction and subsequent reaction are caried out in non-aqueous solvents; thus necessitating chemical disposal problems with the attendant loss of the organic solvents.

The present invention comprises an improvement over the methods of the prior art by providing water soluble monomers polymerized in an aqueous solvent system. Cross-linking of the polymers occurs by means of a condensation reaction between two monomers which takes place simultaneously with the polymerization; therefore, no di-ethylenic monomers are required. The resulting ion-exchange polymeric membranes have the desired high ion-exchange capacities and low electrical resistance. Additionally, the polymerization step requires shorter time periods and lower curing temperatures for a net saving in energy. Also the expense of petroleum derived solvents and the problem of their disposal is eliminated.

SUMMARY OF THE INVENTION

The invention comprises the copolymerization of an aliphatic sulfonic acid monomer such as 2-acrylamido-2-methylpropane sulfonic acid (AMPS) TM, sulfoethylmethacrylate, or sulfopropylmethacrylate, with two other monomers such as acrylamide and N-methylolacrylamide which react simultaneously with the polymerization to form a cross-linking unit. Other cross-linking monomer pairs such as N-methylolmethacrylamide and methacrylamide are usable under the present invention.

AMPS is a white, solid, functional amide monomer containing a vinyl grouping and is highly soluble in water but not greatly soluble in organic solvents.

Acrylamide is a white solid amide monomer containing a vinyl grouping and is highly soluble in water and moderately soluble in polar organic solvents.

N-methylolacrylamide is a hydroxyl containing amide monomer with a vinyl grouping and is usually supplied commercially as a 48% or 60% aqueous solution.

To achieve optimal cross-linking efficiency, a 1:1 mole ratio of acrylamide to N-methylolacrylamide is preferably used, though N-methylolacrylamide alone or with a minor proportion of acrylamide will also form cross-linking units but with the generation of proportional amounts of formaldehyde, an undesirable by-product. When a 1:1 molar ratio of acrylamide to N-methylolacrlamide is used or where a greater amount of acrylamide is used, water is formed as a desirable by-product.

A suitable class of water soluble free-racial generating compounds which can be used as catalysts for polymerization are both the peroxides and the azo catalysts. The water soluble azo catalyst include for example, 2,2'-azobis(2-amidinopropane)dihydrochloride (known under the trademark V-50) and 2,2'-azobis(N,N'-dimethyleneisobutyramidine)dihydrochloride. The water soluble peroxide catalyst include 2,4-pentanedione peroxide, hydrogen peroxide, potassium persulfate and the like. These compounds, which serve as free radical initiators, contain an $-N=N-$ group (azo) or $-O-O-$ group (peroxide) attached to aliphatic carbon atoms, at lease one of which is tertiary. An amount of 0.01% to 2% of the weight of monomer or monomers is usually sufficient.

The polymerization reaction may be carried out in the temperature range of about 40° C.–100° C. but the preferred range is between about 60° C.–80° C.

The preferred procedure for preparing the copolymers of this invention is further illustrated by the following examples:

EXAMPLE 1

To a solution of 2016 ml of NMA-special, which is a commercially available 48% aqueous solution of equimolar amounts of N-methylolacrylamide and acrylamide, was added 1567 gms. of AMPS. After the solution became homogeneous, a solution of 40 gms. of V-50 (2,2'-azobis(2-amidinopropane)dihydrochloride dissolved in 416 ml of water was added. The resulting homogeneous solution was then poured into an 11"×13"×2" deep rectangular tray into which was laid in alternating fashion, glass plates and 20 mil thich modacrylic cloth until the top of the momomer liquid level was reached. The entire tray was put into an oven at 80° C. and heated for 2 hours. At the end of this period, the monomer had turned to a solid mass. The excess resin was chipped from the pan and the glass was removed to yield cloth sheets, 20 mils in thickness surrounded and impregnated with polymerized resin. The resulting membranes were placed in an aqueous sodium bicarbonate solution and analyzed to give the following properties:

Mullen Burst=140 psi
Thickness=0.054 cm.
Resistivity=13.0 ohm-cm$^2$. (0.01N NaCl) (1000 Hz)
Water Content=45.6%
Capacity=2.4 Milliequivalents Na$^+$ per gram of dry resin.

EXAMPLE 2

To a solution of 880 ml of 2-sulfoethyl methacrylate dissolved in 1000 ml of water is added sequentially 500 ml of N-methylolmethacrylamide and 340 gms. of methacrylamide. To this homogeneous solution is added 29 gms of V-50 dissolved in 190 ml. of water. The solution is poured into a rectangular tray and treated in the manner described in Example 1. The resulting membranes are placed in an aqueous sodium bicarbonate solution and analyzed to give the following properties:

Mullen Burst=140 psi
Thickness=0.060 cm.
Resistivity=11.2 ohm-cm$^2$ (0.01N NaCl) (1000 Hz)
Water content=44.6%
Capacity=2.53 Milliequivalents Na$^+$ per gram dry resin As many apparently widely different embodiments of this invention may be made without departing from the spirit and scope thereof, it is to be understood that the invention is not limited to the specific embodiments thereof except as defined in the appended claims.

I claim:

1. The process for making a cation exchange polymer comprising in a single step, the simultaneous cross-linking and polymerization in the presence of a free radical initiator, a pair of monomers (a) and (b) of the formula:

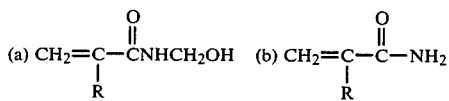

with an aliphatic sulfonic acid monomer of the formula:

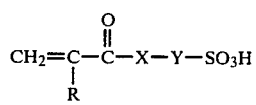

Where R represents CH or H; X represents NH or O and Y represents a straight-chain unit such as ethyl- (—CH$_2$—CH$_2$—) or a branch-chain alkyl unit such as isobutyl (—C(CH$_3$)$_2$CH$_2$—).

2. The process of claim 1 wherein the monomer (a) is N-methylolacrylamide, the monomer (b) is acrylamide and the sulfonic acid monomer is 2-acrylamido-2-methylpropane sulfonic acid.

3. The process of claim 1 wherein the monomer (a) is N-methylolmethacrylamide, the monomer (b) is methacrylamide and the sulfonic acid monomer is 2-sulfoethylmethacrylate.

4. A cation exchange polymer made by the single step process of claim 1.

* * * * *